(12) United States Patent
Kempf

(10) Patent No.: US 10,489,425 B2
(45) Date of Patent: Nov. 26, 2019

(54) USER CLUSTERING BASED ON QUERY HISTORY

(71) Applicant: salesforce.com, inc., San Francisco, CA (US)

(72) Inventor: Guillaume Kempf, Grenoble (FR)

(73) Assignee: salesforce.com, inc., San Francisco, CA (US)

( * ) Notice: Subject to any disclaimer, the term of this patent is extended or adjusted under 35 U.S.C. 154(b) by 266 days.

(21) Appl. No.: 15/794,083

(22) Filed: Oct. 26, 2017

(65) Prior Publication Data

US 2019/0130013 A1    May 2, 2019

(51) Int. Cl.
*G06F 16/28* (2019.01)
*G06F 16/9535* (2019.01)
*G06N 20/00* (2019.01)
*G06N 5/04* (2006.01)

(52) U.S. Cl.
CPC ........ *G06F 16/285* (2019.01); *G06F 16/9535* (2019.01); *G06N 5/04* (2013.01); *G06N 20/00* (2019.01)

(58) Field of Classification Search
CPC ... G06F 16/285; G06F 16/9535; G06N 20/00; G06N 5/04
See application file for complete search history.

(56) References Cited

U.S. PATENT DOCUMENTS

| | | | | |
|---|---|---|---|---|
| 8,060,463 | B1 * | 11/2011 | Spiegel | G06Q 30/02 707/609 |
| 8,977,617 | B1 * | 3/2015 | Wu | G06Q 30/0201 707/736 |
| 2007/0233671 | A1 * | 10/2007 | Oztekin | G06F 16/9535 |
| 2009/0089246 | A1 * | 4/2009 | Chi | G06F 16/35 |
| 2017/0154280 | A1 * | 6/2017 | Adir | G06N 5/045 |

* cited by examiner

*Primary Examiner* — Jorge A Casanova
(74) *Attorney, Agent, or Firm* — Holland & Hart LLP

(57) ABSTRACT

Methods, systems, and devices for user clustering on a cloud platform are described. A user associated with a client may implement a search function to query objects in a database system, and may select an entity (i.e., the clicked entity) from the search results. Each client may utilize the cloud platform in a specific manner, where users associated with the client may frequently search for certain types of objects. In some cases, one or more clients may share similar search histories or clicked entities. A clustering server may group clients with similar search histories or click distributions into common clusters. For future searches, the clustering server may utilize a machine learning model to predict the type of object being searched for based on the clustering. For example, user devices associated with a particular cluster may display similar groups and orders of object types in response to similar queries.

20 Claims, 12 Drawing Sheets

USER CLUSTERING BASED ON QUERY HISTORY

FIELD OF TECHNOLOGY

The present disclosure relates generally to database systems and data processing, and more specifically to user clustering based on query history.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, a user may search for a particular entity or object (e.g., an account object, contact object, opportunity object, custom object, etc.) when accessing a cloud platform. The user may be one of multiple users for a particular client or tenant that utilizes the cloud platform for purposes associated with the client. However, multiple clients or tenants may utilize the cloud platform, where the users of one client may frequently search for different entities or data object types than the users from an alternate client. Techniques are desired for efficiently handling search requests associated with different tenants on a multi-tenant cloud platform.

DETAILED DESCRIPTION

In some database systems, a user may access a cloud platform and may search for data objects stored in the database system. For example, the user may perform a search process using a user device, where the user device may send a query request message to a query handler or database based on the search input. In response to the query, the user device may receive a list of search results for display, and the user may select an object from the search results (e.g., referred to as the clicked entity, which may be an example of an account entity, contact entity, opportunity entity, etc.).

In some cases, one or more users may constitute a client, and multiple clients may utilize the cloud platform. Each client may utilize the cloud platform in a specific manner, and users associated with each client may frequently search for and select certain types of objects. The system may store in memory search histories (e.g., including the clicked entities, search inputs, query morphologies, etc.) for each user or each client. In some cases, one or more clients may have similar search histories, which may be referred to as click distributions. Based on these similar click distributions, a clustering server may group clients with similar click distribution data into common clusters (e.g., using a KMeans algorithm). By clustering the clients based on click distribution, each cluster may utilize a machine learning model (e.g., a random forest model) to predict likely entities that a user is searching for. For example, users for a particular client may often search for Contact data objects. During a clustering procedure, the clustering server may place the client in a cluster with other clients that may also frequently search for Contact data objects. When the cloud platform identifies a query from a user associated with the client, the cloud platform may query Contact data objects first, and a user device of the user may display the Contact data objects first in a list of query results based on the cluster and the machine learning model. This clustering technique may reduce querying latency while limiting the memory overhead associated with tracking click distributions and clusters (e.g., by clustering on the client-level, as opposed to on the user-level).

Aspects of the disclosure are initially described in the context of an environment supporting an on-demand database service. Further aspects of the disclosure are described with respect to a cluster configuration, a click distribution aggregation, a search prediction, and a process flow. Aspects of the disclosure are further illustrated by and described with reference to apparatus diagrams, system diagrams, and flowcharts that relate to user clustering based on query history.

Figure 1:
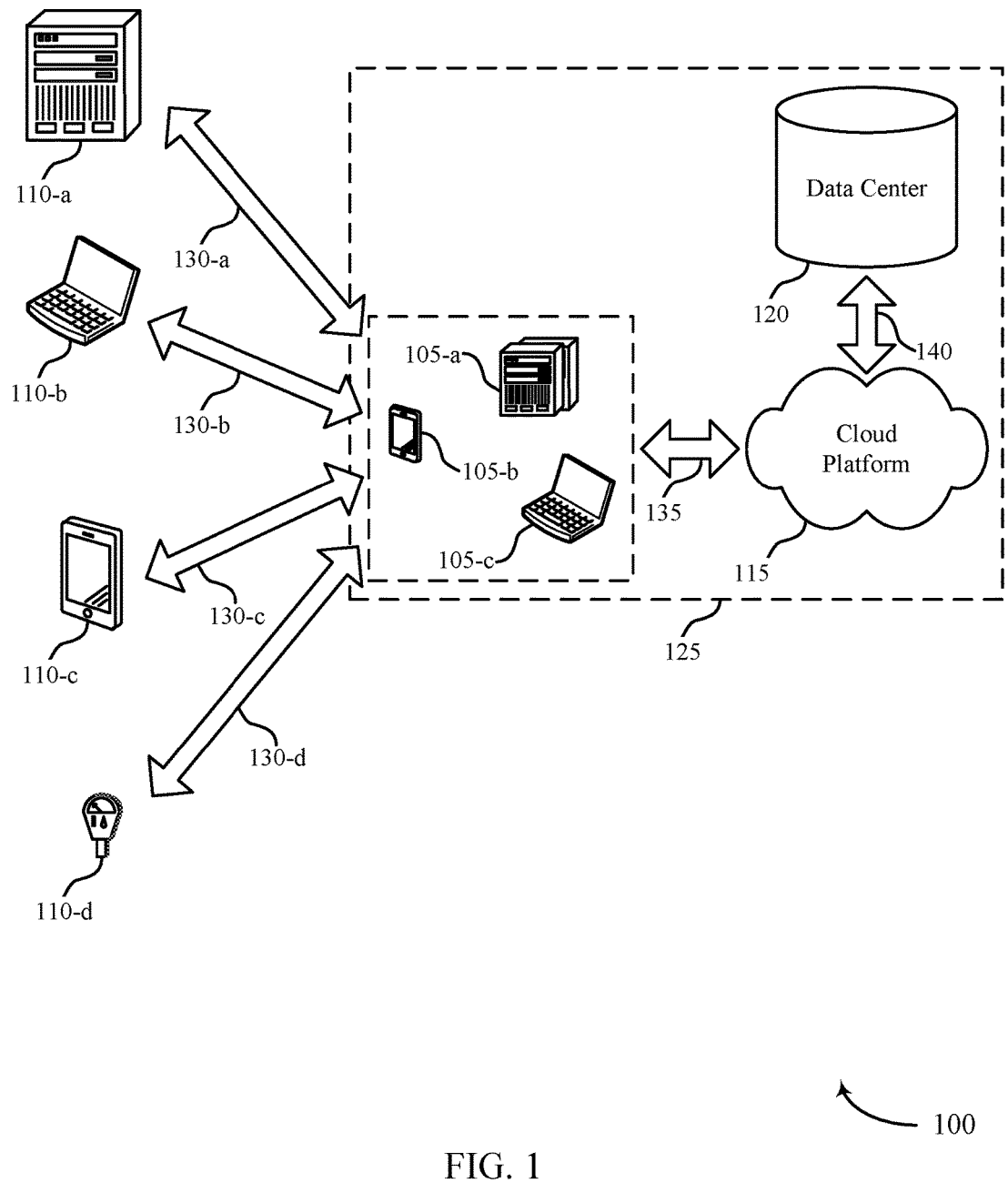
FIG. 1 illustrates an example of a system for user clustering that supports user clustering based on query history in accordance with aspects of the present disclosure.

FIG. 1 illustrates an example of a system 100 for cloud computing that supports user clustering based on query history in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b,* 130-*c,* and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, a user may access the cloud platform 115 through a cloud client 105 or contact 110. The user may be associated with a certain organization, client, or tenant supported by the cloud platform 115. The organization or client may contain multiple users that may attempt to utilize the cloud platform 115 in a similar manner. For example, each user may search for similar entities when accessing the cloud platform 115 for their corresponding client. These entities may be examples of data objects stored at a data center 120 and associated with or owned by the client or a user associated with the client. Additionally, multiple clients may utilize the cloud platform 115 for different client-specific purposes, where the different purposes may include displaying and interacting with different entities on a user device. The different entities may be examples of different data object types, such as an account object associated with the client, a contact object associated with contact information for a user, a custom data object defined for the client, an opportunity object associated with the client, etc. It is to be understood this list of entities is not an exhaustive list of all entities a client may interact with (e.g., view, retrieve from the data center 120, edit, etc.). When accessing the cloud platform 115 for their client, a user may search for a particular entity stored at the data center 120 using a search browser and one or more keywords. The user device may send a query request message—which may be referred to as just a query—to the cloud platform 115 to retrieve a set of search results from the data center 120. In some cases, one or more clients may have similar search or query histories for similar entities.

System 100 may support efficient techniques for grouping one or more clients or one or more users that have similar query histories into clusters. The cloud platform 115 may use these clusters to predict which entity (e.g., which data object type) is most likely to be searched for based on the cluster. Initially, a server (e.g., a clustering server) may gather the query history for each client or user that utilizes the cloud platform 115. For example, if clustering at a client-level, the server may aggregate click distribution data for each user associated with a client, where the click distribution data indicates which entity was selected by the user during a search process. The server may then cluster clients based on their query histories such that clients with similar query histories are grouped together within the same cluster. After the clients have been clustered, if a user performs a search in the cloud platform 115 (e.g., sends a query corresponding to a particular keyword), the server may predict which entities have a higher chance of being selected by the user based on the cluster. The cloud platform 115 may display the entities in the search results according to their likelihood of being chosen, where the entities with higher chances appear higher on a list of suggested entities when a user performs a search. While the clustering process above is described on a client-level, the system 100 may additionally or alternatively implement user-level clustering, where individual users or user devices may be grouped based on their search histories. In some cases, the clustering may be based on a characteristic of a user (e.g., users may be clustered based on the search histories for all users with their same position within an organization). The server may implement clustering using one or more of the above groupings, or any other relevant grouping strategy.

Figure 2:
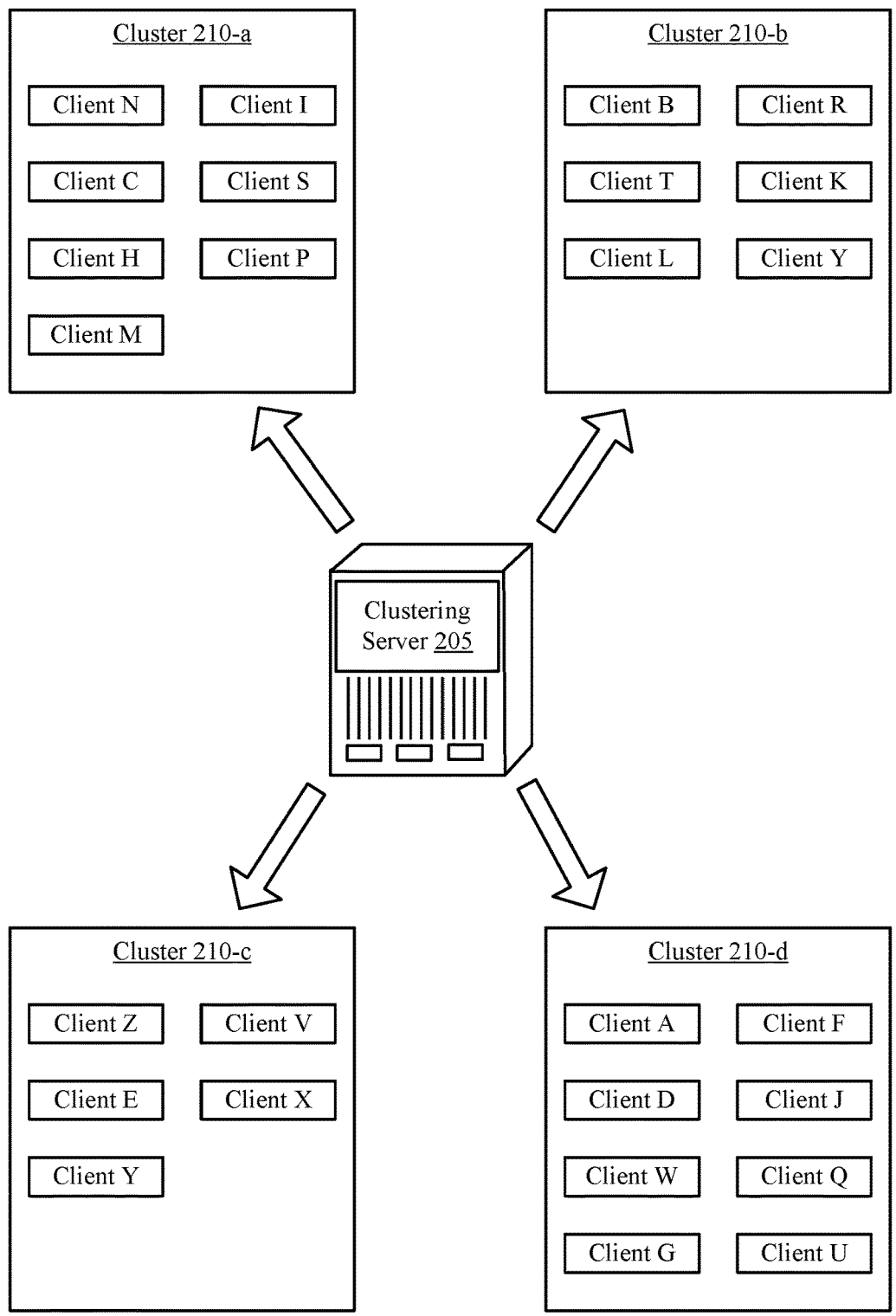
FIG. 2 illustrates an example of a cluster configuration that supports user clustering based on query history in accordance with aspects of the present disclosure.

FIG. 2 illustrates an example of a cluster configuration 200 that supports user clustering based on query history in accordance with various aspects of the present disclosure. A clustering server 205 may assign one or more clusters 210 that include one or more clients based on query histories for each client. The clustering server 205 may store and track indications of the clusters using user identifiers. For example, in the client-level clustering technique described, a user identifier may correspond to a client. However, the user identifiers may alternatively correspond to individual users, user devices, types of users, or groups of clients. The clustering server 205 may be a component of the subsystem 125 as described with reference to FIG. 1. For example, the clustering server 205 may be an example of an application server, a database server, a server cluster, or some similar device or group of devices supporting user clustering services. Each cluster 210 may include clients that have similar query histories, such that clustering server 205 may predict a chosen entity by a user with a higher confidence. While four clusters 210 are shown in cluster configuration 200, it is to be understood that clustering server 205 may assign any number of clusters. Additionally, while cluster 210-*a*, 210-*b*, 210-*c*, and 210-*d* contain seven (7), six (6), five (5), and eight (8) clients, respectively, it is to be understood that the number of clients may vary according to the clustering technique employed by clustering server 205 and the query histories of the clients.

After gathering click distribution data for each client, clustering server 205 may determine a number of clusters 210 to utilize, and may cluster clients into each cluster 210 according to the click distribution data. For example, the click distribution data may include indications of entities that users for each client select when searching for information on a cloud platform. Clustering server 205 may utilize clustering techniques to sort the clients into clusters 210 based on the client query histories. In some cases, the clustering techniques may include a KMeans algorithm, a Gaussian mixture model, a hierarchical clustering algorithm, a density-based clustering algorithm, or a combination thereof. For example, a KMeans algorithm may aim to partition n observations into k clusters, where the n observations correspond to the clients based on their query history and the k clusters correspond to the number of clusters 210. Each observation or client may belong to the cluster 210 with the nearest average of click distributions to their click distribution and query history. For example, Clients N, I, C, S, H, P, and M in cluster 210-*a* may have similar click distribution averages and query histories, while Clients B, R, T, K, L, and Y in cluster 210-*b* may have similar click distribution averages and query histories as each other, but different than the clients in cluster 210-*a*. For KMeans, a larger number of clusters results in a greater predictive algorithm, but also may correspond to a less efficient predictive process and a large memory overhead. In some cases, the clustering server 205 may identify an error threshold for predictive accuracy, and may select a number of clusters that results in a predictive error below the error threshold. This selection procedure for the number of clusters may result in less memory overhead while maintaining a certain level of predictive accuracy. Additionally or alternatively, the clustering server 205 may plot the number of clusters against the predictive error values, and may select a point on the plot—and implement the corresponding number of clusters with associated predictive error value—based on summing the squared distances of points on the plot to their nearest center, and selecting the minimum resulting sum.

Clustering server 205 may predict which entity a user may choose (e.g., click on) when performing or attempting a query for information on the cloud platform based on the assigned cluster of the corresponding client for the user. For example, a user for Client C in cluster 210-*a* may have a certain set of entities displayed in a particular order corresponding to cluster 210-*a* when performing a query. Alternatively, a user for Client V in cluster 210-*c* may have a different set of entities displayed in a particular order when performing a query than the user for Client C. Additionally or alternatively, a similar set of entities may be displayed for each cluster 210, but the order of the entities may depend on the assigned cluster. For example, a user for Client B in cluster 210-*b* may have a first entity displayed first when performing a query, while a user for Client J in cluster 210-*d* may have a second entity displayed first when performing a query.

In some cases, clustering server 205 may predict the entities for each cluster 210 based on a machine-learned prediction model. The machine-learned prediction model may include a random forest model, a neural network model, or a combination thereof. For example, the random forest model may include utilizing multiple decision trees that are trained independently. The random forest may make a prediction by combining predictions of each decision tree by averaging. Each decision tree may correspond to a click distribution for each entity within each cluster 210, where the click distribution may signify the likelihood that the corresponding entity is selected according to a query history for the entity. The random forest may then predict which entity a user may select by combining the click distribution for each entity and averaging them.

Figure 3:
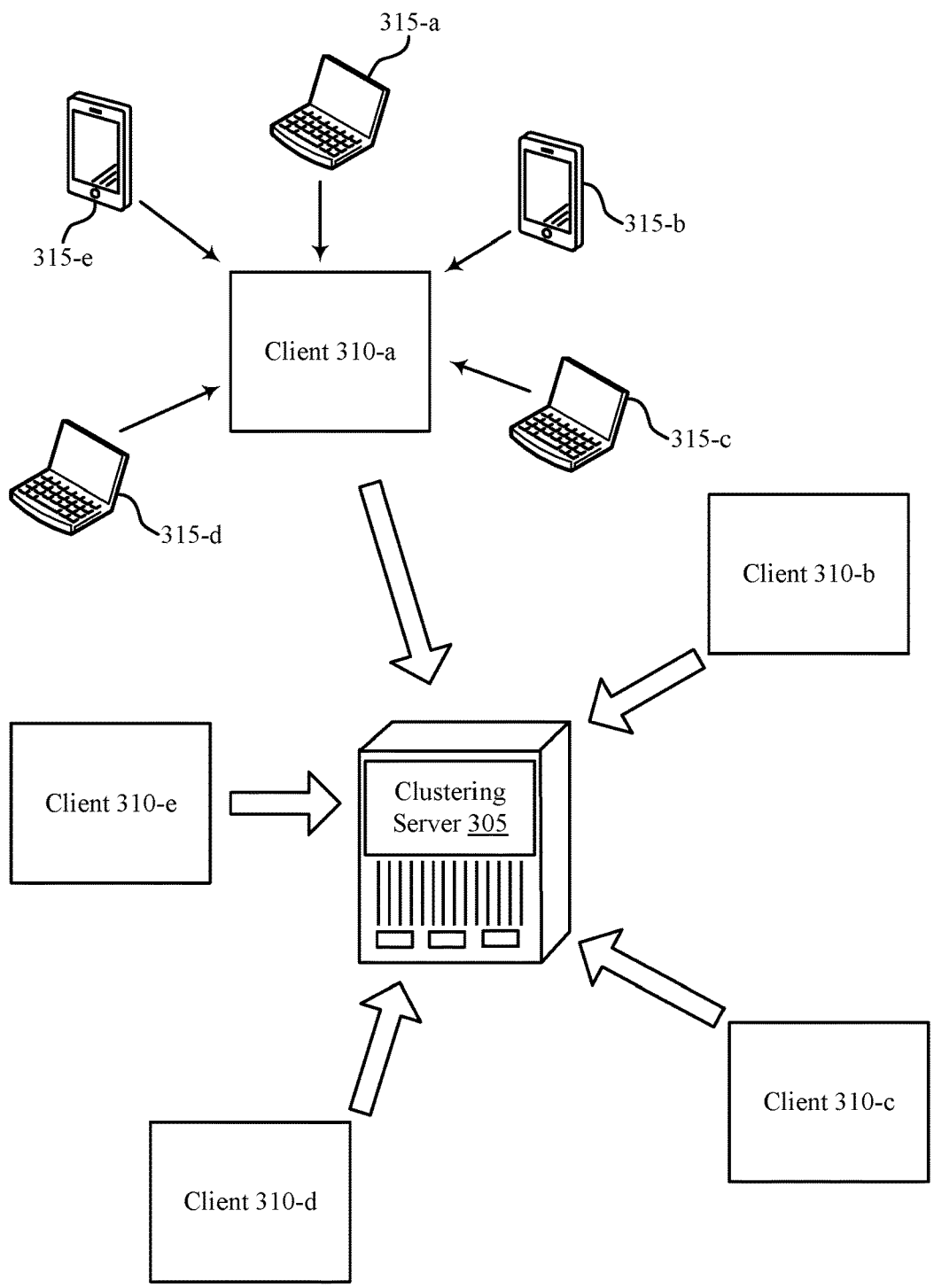
FIG. 3 illustrates an example of a click distribution aggregation that supports user clustering based on query history in accordance with aspects of the present disclosure.

FIG. 3 illustrates an example of a click distribution aggregation 300 that supports user clustering based on query history in accordance with various aspects of the present disclosure. A clustering server 305 may collect and aggregate click distribution data from multiple clients 310. Clustering server 305 may be an example of a clustering server 205 as described with reference to FIG. 2. Clustering server 305 may collect the click distribution data from clients 310 in order to cluster the clients as described above. While five (5) clients 310 are illustrated with respect to FIG. 3, it is to be understood that clustering server 305 may collect and aggregate click distribution data for more or fewer clients 310. In some cases, the clients 310 may be referred to as tenants, and the clustering server 305 may handle query capabilities of the tenants within a multi-tenant database system.

In some cases, each client 310 may include one or more users 315. These users 315 may represent individual user devices or people associated with different user profiles within an organization. As shown, client 310-*a* may include a number of users 315 that access a cloud platform that client 310-*a* utilizes for data storage, management, and retrieval. While five (5) users 315 are shown, it is to be understood that a client 310 (e.g., client 310-*a*) may include more or fewer users 315. Each client 310 may contain a click distribution specific to their users 315 corresponding to chosen entities when performing queries or searches. For example, the click distribution for client 310-*a* may include averages for the number of times each user 315 selects each entity (e.g., data object type) associated with client 310-*a*. Client 310-*a* may collect and aggregate this click distribution data over a certain time period (e.g., for a previous month, six months, year, etc.). In some cases, the click distribution data may include a number of clicks associated with selected entities (e.g., the number of times a user selected a particular data object type from a list of search results), a number of characters in a query, a number of words in the query, or some combination of these or other query morphology characteristics.

Additionally, users 315 may select similar or different entities when performing queries while accessing the cloud platform for client 310-a. For example, users 315-a, 315-c, and 315-d may select a first entity when performing a query, while user 315-b may select a second entity, and user 315-e may select a third entity. As such, the click distribution may include corresponding averages for each entity chosen by users 315 (e.g., 60% for the first entity, 20% for the second entity, and 20% for the third entity). Each client 310 may transmit their respective click distribution data to clustering server 305. Clustering server 305 may store the click distribution data in a database (e.g., a click-frequency dictionary database).

In some cases, the click distributions for each client 310 may have approximately similar averages for each entity or may have different averages for each entity. For example, clients 310-a and 310-b may have approximately similar averages for each entity (e.g., within a pre-determined or dynamic threshold percentage), clients 310-c and 310-e may have approximately similar averages for each entity but are different than the averages for clients 310-a and 310-b, and client 310-d may have an average for each entity different than the other clients. Clustering server 305 may cluster the clients 310 according to these approximately similar averages (e.g., clients 310-a and 310-b in a first cluster, clients 310-c and 310-e in a second cluster, and client 310-d in a third cluster). In some cases, clustering server 305 may utilize a clustering technique when determining the clusters as described above with reference to FIG. 2 (e.g., a KMeans algorithm, a Gaussian mixture model, a hierarchical clustering algorithm, a density-based clustering algorithm, or a combination thereof).

Additionally, the clustering server 305 may implement pseudo-real time tracking of the click distribution data. For example, even if the clustering server 305 has previously grouped the clients 310 into clusters, the clustering server 305 may continue to receive click distribution data from the clients 310. A user 315 for a client 310 may perform further searches or queries, and the clustering server may track the entities selected as results of these queries. For these new queries and click information, the clients 310 may transmit updated or additional click distribution data to clustering server 305, and clustering server 305 may update the full click distribution data accordingly, which may affect the configured clusters. In some cases, clustering server 305 may continually perform sorting algorithms to determine the clusters for each client 310 in order to display search results efficiently. In other cases, clustering server 305 may periodically or aperiodically (e.g., based on some trigger, such as an administrator input) perform a clustering algorithm to update the clusters based on the modified click distribution data.

Figure 4:
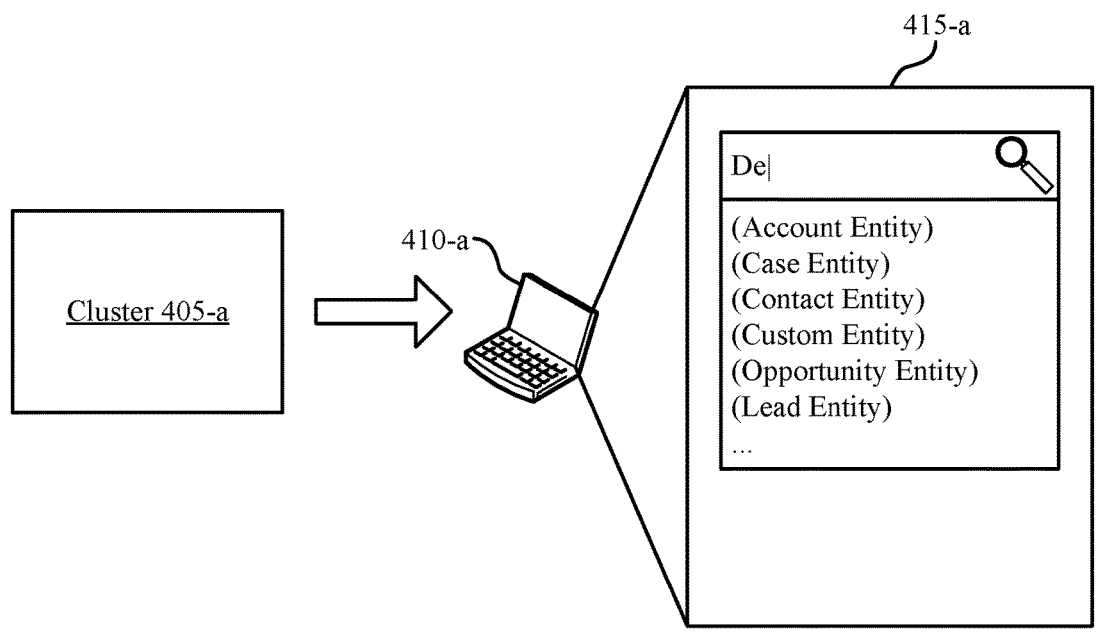
FIG. 4 illustrates an example of a query prediction that supports user clustering based on query history in accordance with aspects of the present disclosure.
Figure 4:
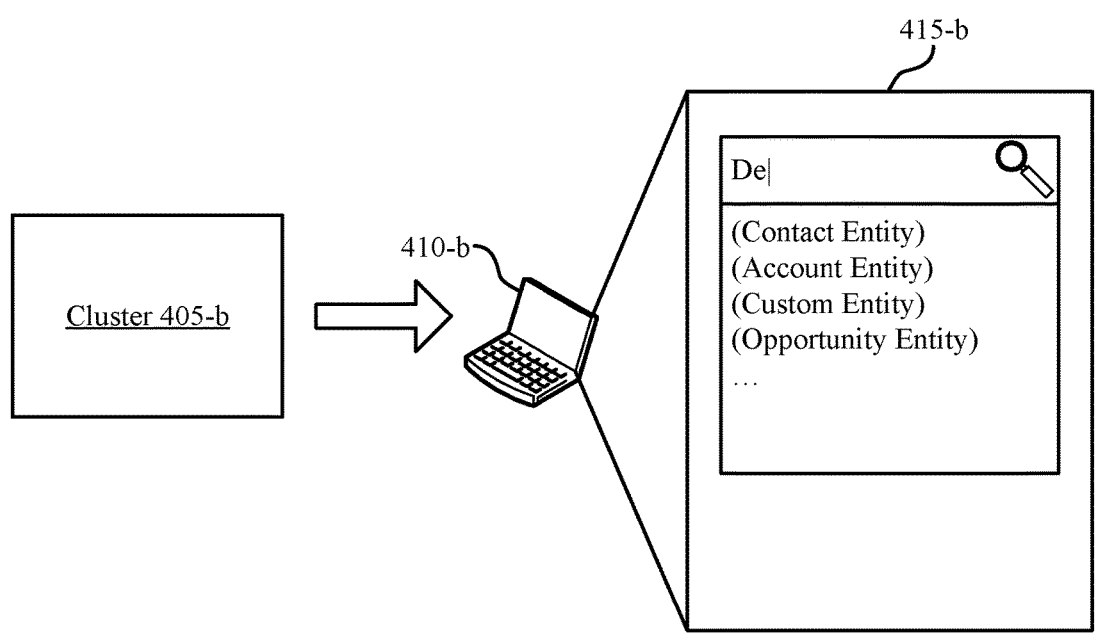

FIG. 4 illustrates an example of a query prediction 400 that supports user clustering based on query history in accordance with various aspects of the present disclosure. Query prediction 400 may include a cluster 405-a and a cluster 405-b, which may have been configured as described above with reference to FIGS. 1-3. Each cluster has a respective, exemplary user 410 that may be performing a search in a search window 415. This search window 415 may send a query request message to a database to retrieve one or more entities (e.g., data objects) based on the keyword or keywords input into the search window 415. As described above, a clustering server may predict which entities to display and their order for a user 410 based on the cluster 405 for that user 410 (e.g., in a client-level clustering system, the cluster 405 for the client associated with that user 410). For example, the clustering server may utilize a machine-learned prediction model to predict the entities and their order to display (e.g., a random forest model, a neural network model, or a combination thereof).

In some cases, user 410-a may be part of a first client that the clustering server placed into cluster 405-a. When user 410-a performs a search in search window 415-a by typing some string of characters (e.g., "De"), the user device may transmit a query request message to retrieve data from a database associated with this keyword, "De." The database may return a particular set of entities with an associated order to the user device, and the user device may display these entities in the particular order (e.g., Account Entities first, Case Entities second, Contact Entities third, a type of custom entities fourth, Opportunity Entities fifth, Lead Entities sixth, etc.). For example, if the database returns three (3) Account data objects, one (1) Contact data object, and four (4) Opportunity data objects in response to the query, the user device may display the data objects in a user interface in that order. Alternatively, user 410-b may be part of a second client that the clustering server clustered into cluster 405-b. When user 410-b performs a search in search window 415-b, the user device may display entities in a different order. This is illustrated in an exemplary case where user 410-b types the same string of characters as user 410-a (e.g., "De"), and the corresponding query from the user device results in a different set of entities, a different order of entities, or both (e.g., Contact Entity first, Account Entity second, Custom Entity third, Opportunity Entity fourth, etc.).

The clustering server may order the entities for each cluster 405 such that the entities with a higher predicted chance of being selected appear higher in the order or list of suggested entities. For example, in previous searches, user 410-a or other users associated with the same client as user 410-a may frequently select Account entities from the search results. The user device may display a list of data objects queried based on a search, and a user 410-a may click on one Account data object of the list of data objects in order to view more information associated with that Account data object. This selection may be recorded in the click distribution data, along with information related to the query. If user 410-a—and other users 410 associated with the same client—frequently select Account objects from the search results, the client may be placed in a cluster 405-a with other clients that frequently search for Account data objects. In this way, future searches performed by these clients will result in Account data objects displayed earlier in the search results. This may improve the efficiency of searching, as user 410-a may not have to scroll down a user interface or move to a new page (e.g., in a paginated search results interface). Additionally, in some case, this may improve the efficiency of queries, as a query may have a limit to the number of data objects it may retrieve. If the query retrieves entities more likely to be selected by the user 410, the system may reduce the number of queries sent for each search process, reducing the query latency and overhead in the system.

Figure 5:
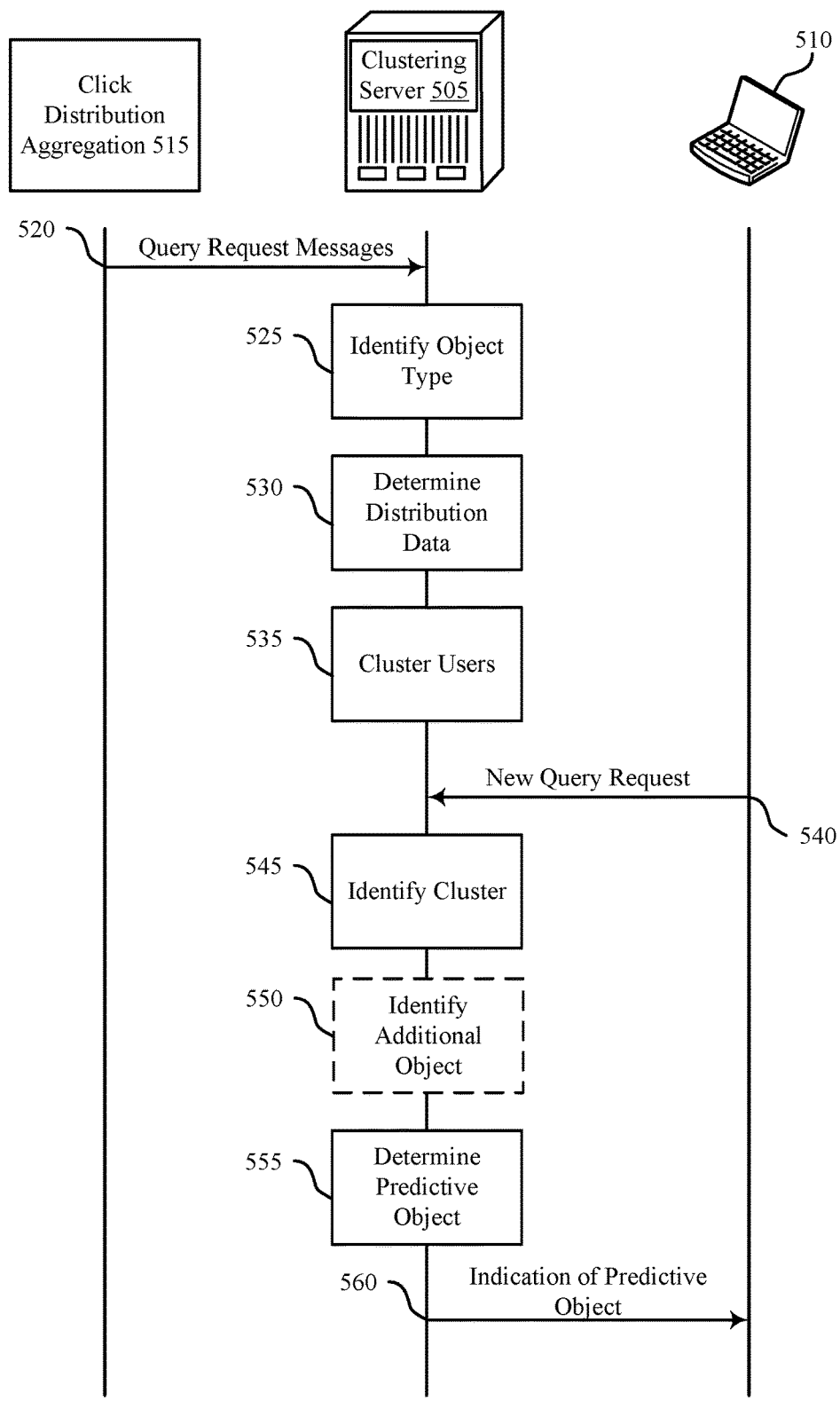
FIG. 5 illustrates an example of a process flow that supports user clustering based on query history in accordance with aspects of the present disclosure.

FIG. 5 illustrates an example of a process flow 500 that supports user clustering based on query history in accordance with various aspects of the present disclosure. Process flow 500 may include a clustering server 505 and a user 510, which may be examples of a clustering server and a user as described with reference to FIGS. 1-4. Process flow 500 may also include a click distribution aggregation 515, which may aggregate click distribution data from a plurality of users and corresponding clients as described with reference to FIG. 3. In some cases, this aggregation process may be performed by the clustering server 505 or some other server. Additionally, process flow 500 may illustrate a clustering procedure performed by clustering server 505 as described above.

In the following description of the process flow 500, the operations between the clustering server 505, user 510, and click distribution aggregation 515 may be performed in different orders or at different times. Certain operations may also be left out of process flow 500, or other operations may be added to process flow 500.

At 520, clustering server 505 may receive a plurality of query request messages corresponding to a plurality of user identifiers (e.g., users and their corresponding clients). In some cases, clustering server 505 may determine a time period for analysis, where the plurality of query request messages are received during the time period for analysis. At 525, clustering server 505 may identify a selected object type (e.g., an entity or data object type) for each query request message based on the received plurality of query request messages.

At 530, clustering server 505 may determine distribution data (e.g., click distribution data) for the plurality of user identifiers, where the distribution data includes an association between each user identifier of the plurality of user identifiers and a number of query request messages associated with each selected object type. In some cases, the distribution data may include indicators of a number of clicks associated with selected object types, a number of characters in a query request message, a number of words in the query request message, or a combination thereof. Additionally, clustering server 505 may store the distribution data in a click-frequency dictionary database.

At 535, clustering server 505 may cluster the plurality of user identifiers into a plurality of clusters based on the distribution data and a relationship between a number of the plurality of clusters and an error threshold. In some cases, clustering server 505 may select the number of the plurality of clusters based on a clustering algorithm, where the clustering algorithm depends on the relationship between the number of the plurality of clusters and the error threshold. The clustering algorithm may include a KMeans algorithm, a Gaussian mixture model, a hierarchical clustering algorithm, a density-based clustering algorithm, or a combination thereof.

At 540, clustering server 505 may receive a new query request message corresponding to a specific user identifier (e.g., user 510) of the plurality of user identifiers. At 545, clustering server 505 may identify a cluster of the plurality of clusters that contains the specific user identifier. Additionally or alternatively, at 550, clustering server 505 may identify an additional selected object type for the new query request message (e.g., in a pseudo-real time system). Consequently, clustering server 505 may update the distribution data based on the additional selected object type and update the clustering based on the updated distribution data.

At 555, clustering server 505 may determine one or more predictive queried object types for the specific user identifier based on the cluster. In some cases, clustering server 505 may determine a predictive order of relevant queried object types for the specific user identifier based on the cluster, where the transmitted indication of the one or more predictive queried object types indicates the predictive order. Additionally, determining the one or more predictive queried object types may be further based on a machine-learned prediction model, where the machine-learned prediction model includes a random forest model, a neural network model, or a combination thereof.

At 560, clustering server 505 may transmit an indication of the one or more predictive queried object types to a user device (e.g., user 510) of the specific user identifier for display in a user interface. The user device may display the predictive queried object types in a predictive order based on the cluster corresponding to the user 510.

Figure 6:
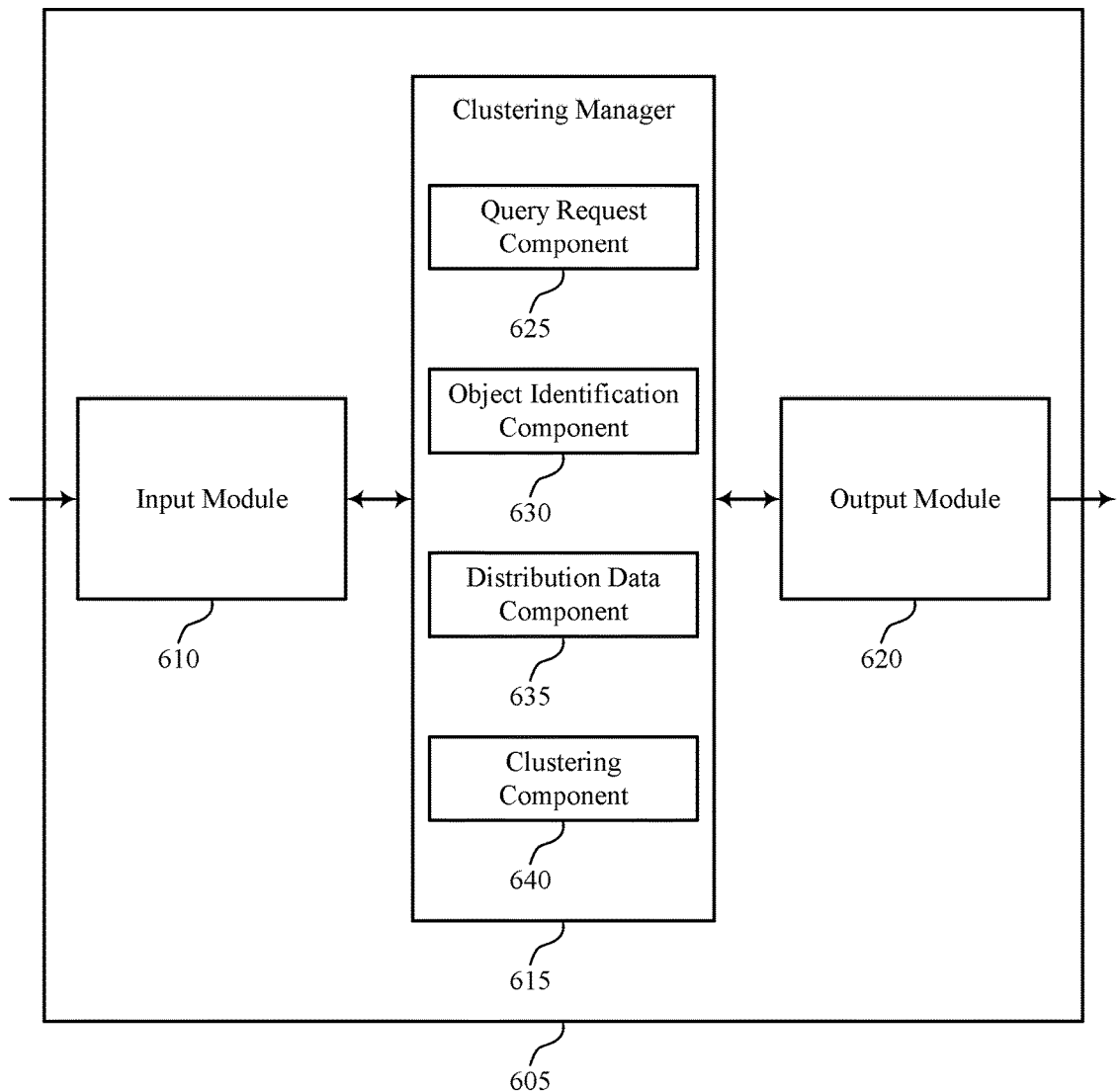
FIGS. 6 and 7 show block diagrams of a device that supports user clustering based on query history in accordance with aspects of the present disclosure.

FIG. 6 shows a block diagram 600 of an apparatus 605 that supports user clustering based on query history in accordance with aspects of the present disclosure. Apparatus 605 may include input module 610, clustering manager 615, and output module 620. Apparatus 605 may also include a processor. Each of these components may be in communication with one another (e.g., via one or more buses). In some cases, apparatus 605 may be an example of a user terminal, a database server, or a system containing multiple computing devices.

Clustering manager 615 may be an example of aspects of the clustering manager 815 described with reference to FIG. 8.

Clustering manager 615 and/or at least some of its various sub-components may be implemented in hardware, software executed by a processor, firmware, or any combination thereof. If implemented in software executed by a processor, the functions of the clustering manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The clustering manager 615 and/or at least some of its various sub-components may be physically located at various positions, including being distributed such that portions of functions are implemented at different physical locations by one or more physical devices. In some examples, clustering manager 615 and/or at least some of its various sub-components may be a separate and distinct component in accordance with various aspects of the present disclosure. In other examples, clustering manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Clustering manager 615 may also include query request component 625, object identification component 630, distribution data component 635, and clustering component 640.

Query request component 625 may receive a set of query request messages corresponding to a set of user identifiers and receive a new query request message corresponding to a specific user identifier of the set of user identifiers.

Object identification component 630 may identify a selected object type for each query request message based on the received set of query request messages and identify an additional selected object type for the new query request message.

Distribution data component 635 may determine distribution data for the set of user identifiers, where the distribution data includes an association between each user identifier of the set of user identifiers and a number of query request messages associated with each selected object type, update the distribution data based on the additional selected object type, and store the distribution data in a click-frequency dictionary database. In some cases, the distribution data includes indicators of a number of clicks associated with selected object types, a number of characters in a query request message, a number of words in the query request message, or a combination thereof.

Clustering component 640 may cluster the set of user identifiers into a set of clusters based on the distribution data and a relationship between a number of the set of clusters and an error threshold, update the clustering based on the updated distribution data, and select the number of the set of clusters based on a clustering algorithm, where the clustering algorithm depends on the relationship between the number of the set of clusters and the error threshold. In some cases, the clustering algorithm includes a KMeans algorithm, a Gaussian mixture model, a hierarchical clustering algorithm, a density-based clustering algorithm, or a combination thereof.

Figure 7:
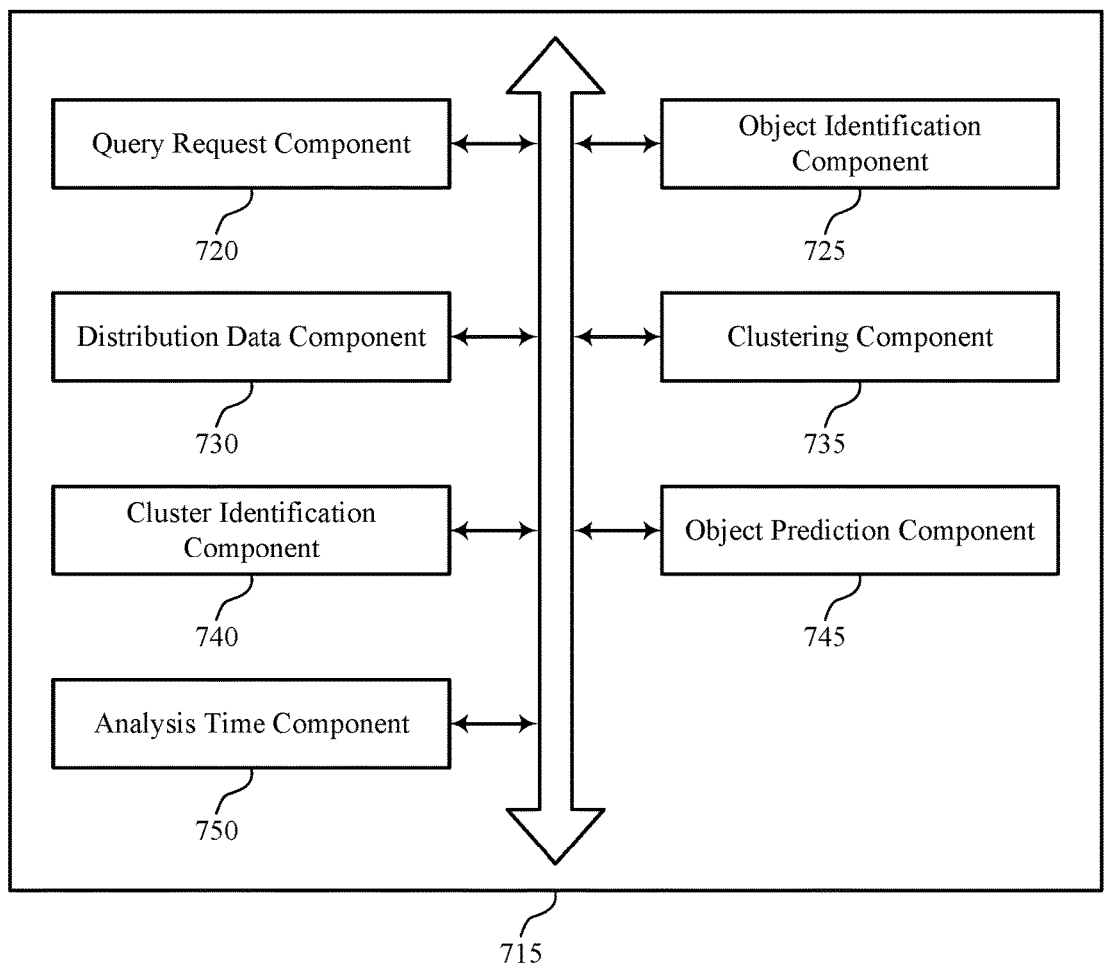

FIG. 7 shows a block diagram 700 of a clustering manager 715 that supports user clustering based on query history in accordance with aspects of the present disclosure. The clustering manager 715 may be an example of aspects of a clustering manager 615 or 815 described with reference to FIGS. 6 and 8. The clustering manager 715 may include query request component 720, object identification component 725, distribution data component 730, clustering component 735, cluster identification component 740, object prediction component 745, and analysis time component 750. Each of these modules may communicate, directly or indirectly, with one another (e.g., via one or more buses).

Query request component 720 may receive a set of query request messages corresponding to a set of user identifiers and receive a new query request message corresponding to a specific user identifier of the set of user identifiers.

Object identification component 725 may identify a selected object type for each query request message based on the received set of query request messages and identify an additional selected object type for the new query request message.

Distribution data component 730 may determine distribution data for the set of user identifiers, where the distribution data includes an association between each user identifier of the set of user identifiers and a number of query request messages associated with each selected object type, update the distribution data based on the additional selected object type, and store the distribution data in a click-frequency dictionary database. In some cases, the distribution data includes indicators of a number of clicks associated with selected object types, a number of characters in a query request message, a number of words in the query request message, or a combination thereof.

Clustering component 735 may cluster the set of user identifiers into a set of clusters based on the distribution data and a relationship between a number of the set of clusters and an error threshold, update the clustering based on the updated distribution data, and select the number of the set of clusters based on a clustering algorithm, where the clustering algorithm depends on the relationship between the number of the set of clusters and the error threshold. In some cases, the clustering algorithm includes a KMeans algorithm, a Gaussian mixture model, a hierarchical clustering algorithm, a density-based clustering algorithm, or a combination thereof.

Cluster identification component 740 may identify a cluster of the set of clusters that contains the specific user identifier.

Object prediction component 745 may determine one or more predictive queried object types for the specific user identifier based on the cluster and transmit an indication of the one or more predictive queried object types to a user device of the specific user identifier for display in a user interface. In some cases, determining the one or more predictive queried object types includes determining a predictive order of relevant queried object types for the specific user identifier based on the cluster, where the transmitted indication of the one or more predictive queried object types indicates the predictive order. In some cases, the determining the one or more predictive queried object types is further based on a machine-learned prediction model. In some cases, the machine-learned prediction model includes a random forest model, a neural network model, or a combination thereof.

Analysis time component 750 may determine a time period for analysis, where the set of query request messages are received during the time period for analysis.

Figure 8:
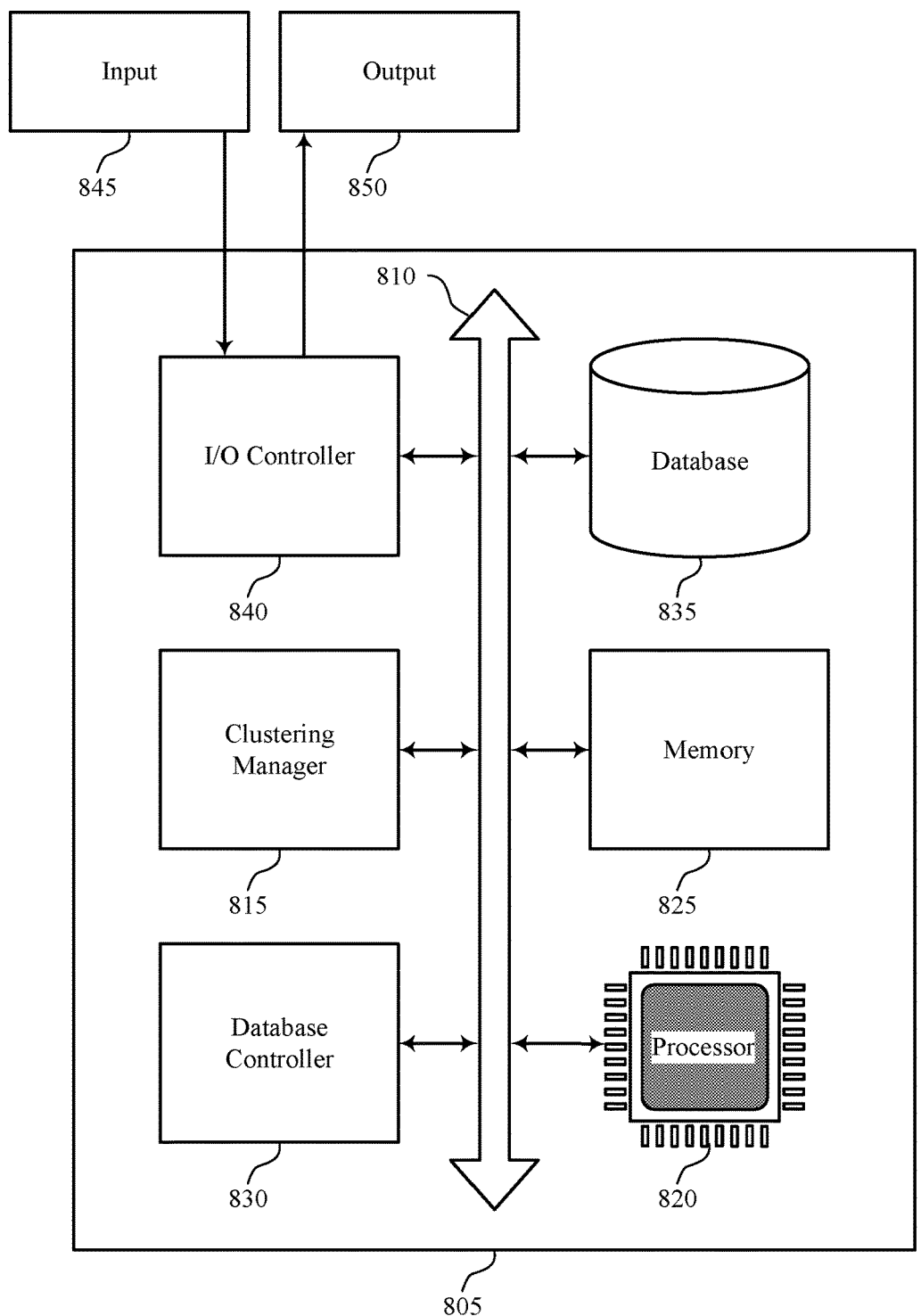
FIG. 8 illustrates a block diagram of a system including a clustering server that supports user clustering based on query history in accordance with aspects of the present disclosure.

FIG. 8 shows a diagram of a system 800 including a device 805 that supports user clustering based on query history in accordance with aspects of the present disclosure. Device 805 may be an example of or include the components of clustering server 205, 305, or 505 as described above, e.g., with reference to FIGS. 2, 3, and 5. Device 805 may include components for bi-directional data communications including components for transmitting and receiving communications, including clustering manager 815, processor 820, memory 825, database controller 830, database 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting user clustering based on query history).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Database controller 830 may manage data storage and processing in database 835. In some cases, a user may interact with database controller 830. In other cases, database controller 830 may operate automatically without user interaction.

Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
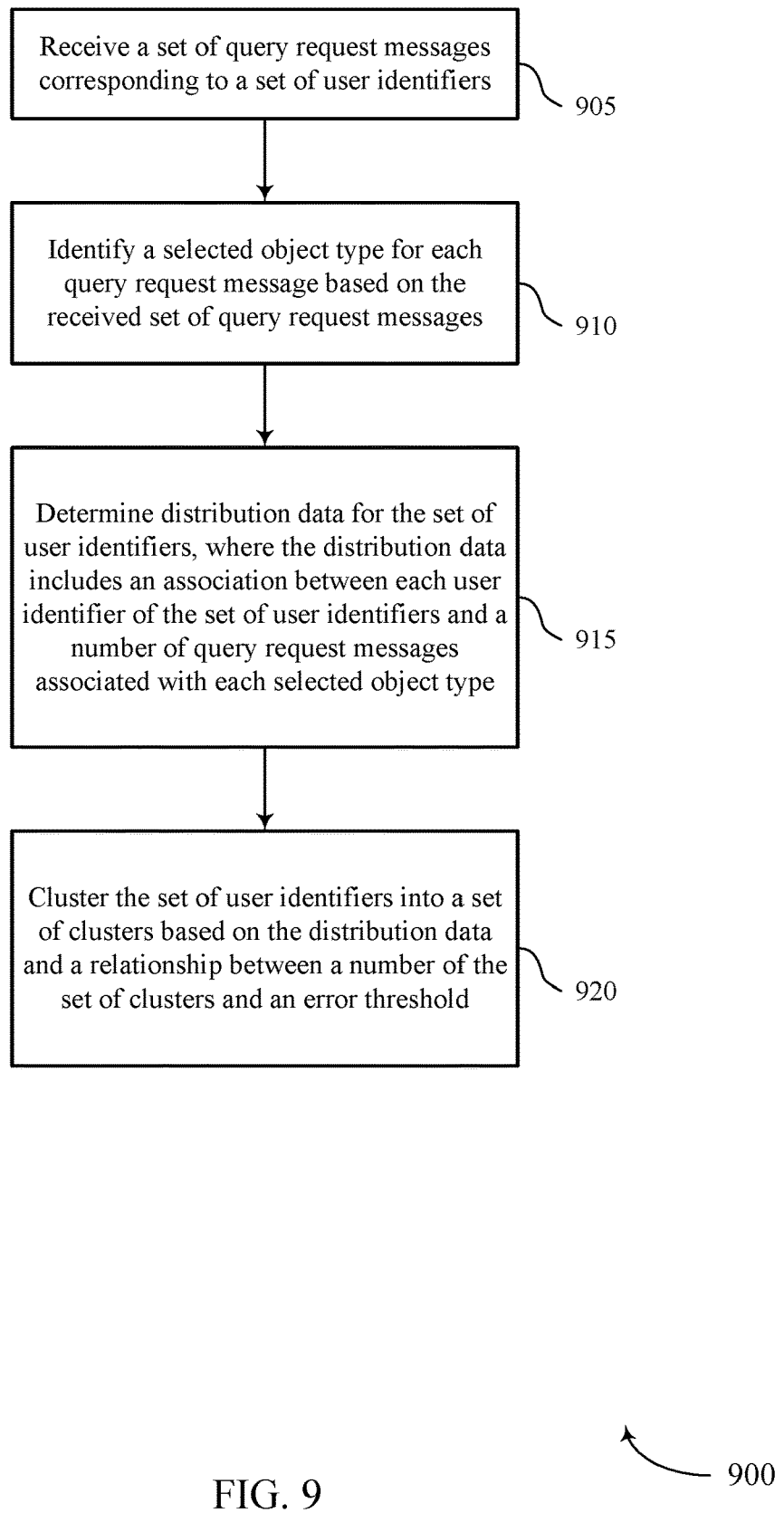
FIGS. 9 through 12 illustrate methods for user clustering based on query history in accordance with aspects of the present disclosure.

FIG. 9 shows a flowchart illustrating a method 900 for user clustering based on query history in accordance with aspects of the present disclosure. The operations of method 900 may be implemented by a clustering server 205, 305, or 505 or its components as described herein, e.g., with reference to FIGS. 2, 3, and 5. For example, the operations of method 900 may be performed by a clustering manager as described with reference to FIGS. 6 through 8. In some examples, a clustering server may execute a set of codes to control the functional elements of the device to perform the functions described below. Additionally or alternatively, the clustering server may perform aspects of the functions described below using special-purpose hardware.

At 905, the clustering server may receive a plurality of query request messages corresponding to a plurality of user identifiers. The operations of 905 may be performed according to the methods described herein. In certain examples, aspects of the operations of 905 may be performed by a query request component as described with reference to FIGS. 6 through 8.

At 910, the clustering server may identify a selected object type for each query request message based on the received plurality of query request messages. The operations of 910 may be performed according to the methods described herein. In certain examples, aspects of the operations of 910 may be performed by an object identification component as described with reference to FIGS. 6 through 8.

At 915, the clustering server may determine distribution data for the plurality of user identifiers, where the distribution data includes an association between each user identifier of the plurality of user identifiers and a number of query request messages associated with each selected object type. The operations of 915 may be performed according to the methods described herein. In certain examples, aspects of the operations of 915 may be performed by a distribution data component as described with reference to FIGS. 6 through 8.

At 920, the clustering server may cluster the plurality of user identifiers into a plurality of clusters based on the distribution data and a relationship between a number of the plurality of clusters and an error threshold. The operations of 920 may be performed according to the methods described herein. In certain examples, aspects of the operations of 920 may be performed by a clustering component as described with reference to FIGS. 6 through 8.

Figure 10:
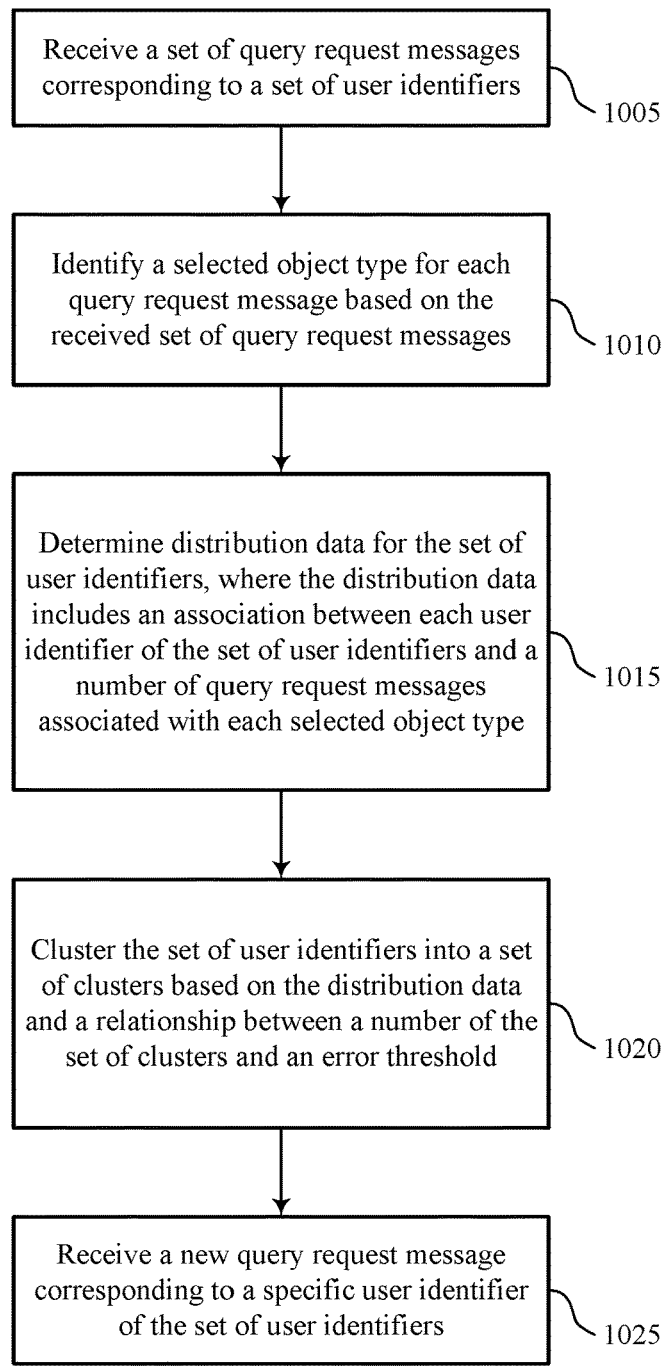

FIG. 10 shows a flowchart illustrating a method 1000 for user clustering based on query history in accordance with aspects of the present disclosure. The operations of method 1000 may be implemented by a clustering server 205, 305, or 505 or its components as described herein, e.g., with reference to FIGS. 2, 3, and 5. For example, the operations of method 1000 may be performed by a clustering manager as described with reference to FIGS. 6 through 8. In some examples, a clustering server may execute a set of codes to control the functional elements of the device to perform the functions described below. Additionally or alternatively, the clustering server may perform aspects of the functions described below using special-purpose hardware.

At 1005, the clustering server may receive a plurality of query request messages corresponding to a plurality of user identifiers. The operations of 1005 may be performed according to the methods described herein. In certain examples, aspects of the operations of 1005 may be performed by a query request component as described with reference to FIGS. 6 through 8.

At 1010, the clustering server may identify a selected object type for each query request message based on the received plurality of query request messages. The operations of 1010 may be performed according to the methods described herein. In certain examples, aspects of the operations of 1010 may be performed by an object identification component as described with reference to FIGS. 6 through 8.

At 1015, the clustering server may determine distribution data for the plurality of user identifiers, where the distribution data includes an association between each user identifier of the plurality of user identifiers and a number of query request messages associated with each selected object type. The operations of 1015 may be performed according to the methods described herein. In certain examples, aspects of the operations of 1015 may be performed by a distribution data component as described with reference to FIGS. 6 through 8.

At 1020, the clustering server may cluster the plurality of user identifiers into a plurality of clusters based on the distribution data and a relationship between a number of the plurality of clusters and an error threshold. The operations of 1020 may be performed according to the methods described herein. In certain examples, aspects of the operations of 1020 may be performed by a clustering component as described with reference to FIGS. 6 through 8.

At 1025, the clustering server may receive a new query request message corresponding to a specific user identifier of the plurality of user identifiers. The operations of 1025 may be performed according to the methods described herein. In certain examples, aspects of the operations of 1025 may be performed by a query request component as described with reference to FIGS. 6 through 8.

Figure 11:
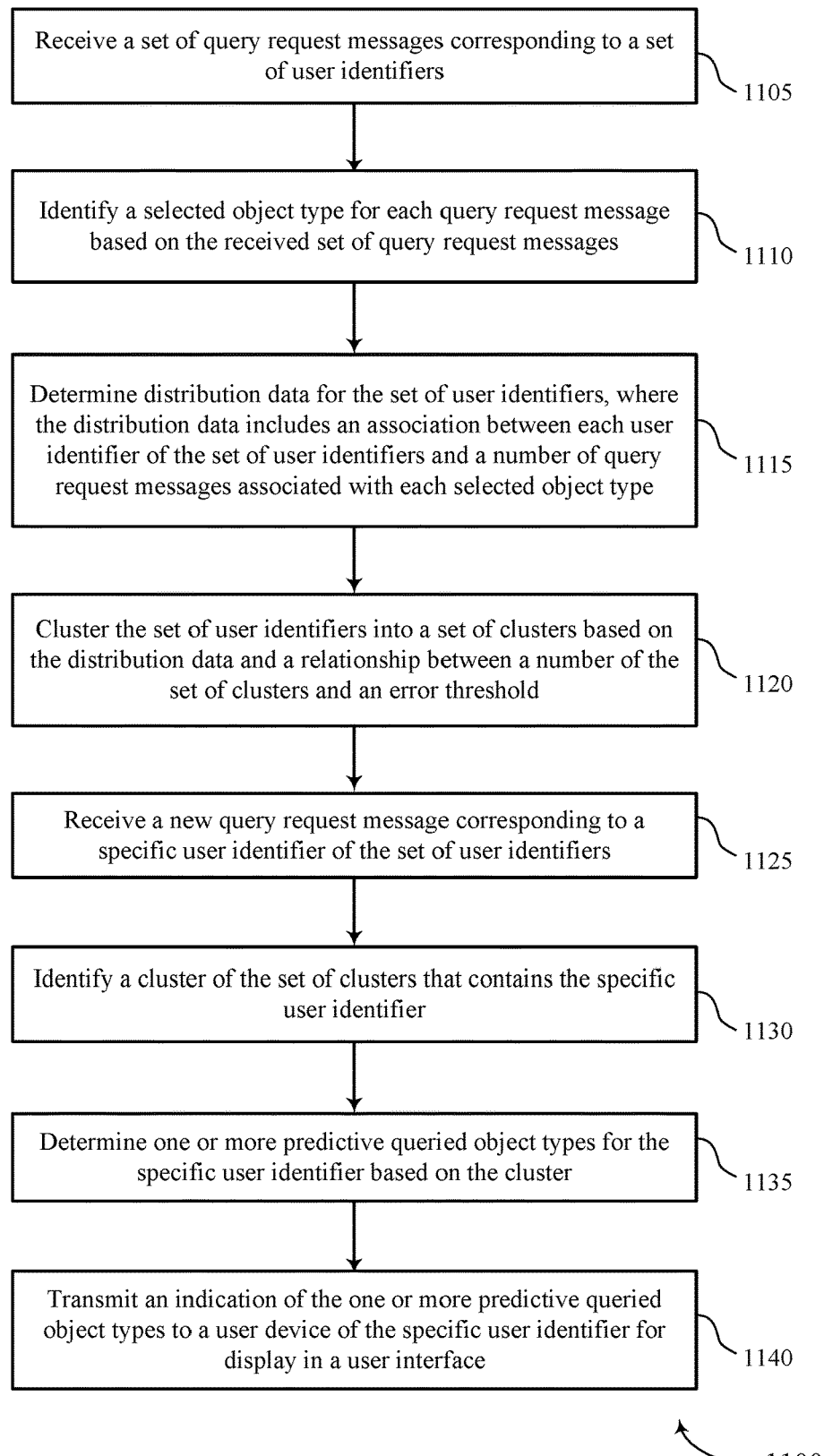

FIG. 11 shows a flowchart illustrating a method 1100 for user clustering based on query history in accordance with aspects of the present disclosure. The operations of method 1100 may be implemented by a clustering server 205, 305, or 505 or its components as described herein, e.g., with reference to FIGS. 2, 3, and 5. For example, the operations of method 1100 may be performed by a clustering manager as described with reference to FIGS. 6 through 8. In some examples, a clustering server may execute a set of codes to control the functional elements of the device to perform the functions described below. Additionally or alternatively, the clustering server may perform aspects of the functions described below using special-purpose hardware.

At 1105, the clustering server may receive a plurality of query request messages corresponding to a plurality of user identifiers. The operations of 1105 may be performed according to the methods described herein. In certain examples, aspects of the operations of 1105 may be performed by a query request component as described with reference to FIGS. 6 through 8.

At 1110, the clustering server may identify a selected object type for each query request message based on the received plurality of query request messages. The operations of 1110 may be performed according to the methods described herein. In certain examples, aspects of the operations of 1110 may be performed by an object identification component as described with reference to FIGS. 6 through 8.

At 1115, the clustering server may determine distribution data for the plurality of user identifiers, where the distribution data includes an association between each user identifier of the plurality of user identifiers and a number of query request messages associated with each selected object type. The operations of 1115 may be performed according to the methods described herein. In certain examples, aspects of the operations of 1115 may be performed by a distribution data component as described with reference to FIGS. 6 through 8.

At 1120, the clustering server may cluster the plurality of user identifiers into a plurality of clusters based on the distribution data and a relationship between a number of the plurality of clusters and an error threshold. The operations of 1120 may be performed according to the methods described herein. In certain examples, aspects of the operations of 1120 may be performed by a clustering component as described with reference to FIGS. 6 through 8.

At 1125, the clustering server may receive a new query request message corresponding to a specific user identifier of the plurality of user identifiers. The operations of 1125 may be performed according to the methods described herein. In certain examples, aspects of the operations of 1125 may be performed by a query request component as described with reference to FIGS. 6 through 8.

At 1130, the clustering server may identify a cluster of the plurality of clusters that contains the specific user identifier. The operations of 1130 may be performed according to the methods described herein. In certain examples, aspects of the operations of 1130 may be performed by a cluster identification component as described with reference to FIGS. 6 through 8.

At 1135, the clustering server may determine one or more predictive queried object types for the specific user identifier based on the cluster. The operations of 1135 may be performed according to the methods described herein. In certain examples, aspects of the operations of 1135 may be performed by an object prediction component as described with reference to FIGS. 6 through 8.

At 1140, the clustering server may transmit an indication of the one or more predictive queried object types to a user device of the specific user identifier for display in a user interface. The operations of 1140 may be performed according to the methods described herein. In certain examples, aspects of the operations of 1140 may be performed by an object prediction component as described with reference to FIGS. 6 through 8.

Figure 12:
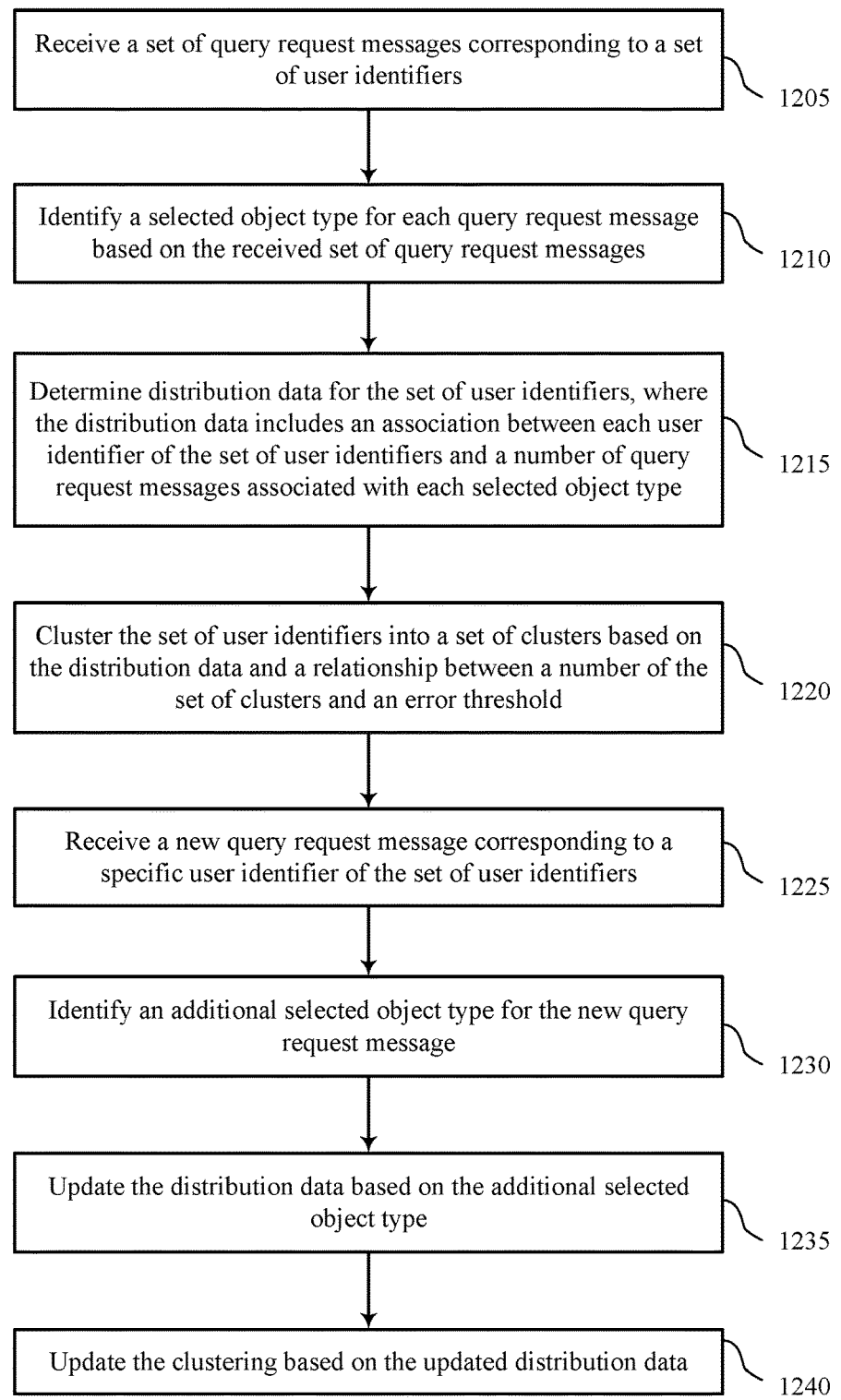

FIG. 12 shows a flowchart illustrating a method 1200 for user clustering based on query history in accordance with aspects of the present disclosure. The operations of method 1200 may be implemented by a clustering server 205, 305, or 505 or its components as described herein, e.g., with reference to FIGS. 2, 3, and 5. For example, the operations of method 1200 may be performed by a clustering manager as described with reference to FIGS. 6 through 8. In some examples, a clustering server may execute a set of codes to control the functional elements of the device to perform the functions described below. Additionally or alternatively, the clustering server may perform aspects of the functions described below using special-purpose hardware.

At 1205, the clustering server may receive a plurality of query request messages corresponding to a plurality of user identifiers. The operations of 1205 may be performed according to the methods described herein. In certain examples, aspects of the operations of 1205 may be performed by a query request component as described with reference to FIGS. 6 through 8.

At 1210, the clustering server may identify a selected object type for each query request message based on the received plurality of query request messages. The operations of 1210 may be performed according to the methods described herein. In certain examples, aspects of the operations of 1210 may be performed by an object identification component as described with reference to FIGS. 6 through 8.

At 1215, the clustering server may determine distribution data for the plurality of user identifiers, where the distribution data includes an association between each user identifier of the plurality of user identifiers and a number of query request messages associated with each selected object type. The operations of 1215 may be performed according to the methods described herein. In certain examples, aspects of the operations of 1215 may be performed by a distribution data component as described with reference to FIGS. 6 through 8.

At 1220, the clustering server may cluster the plurality of user identifiers into a plurality of clusters based on the distribution data and a relationship between a number of the plurality of clusters and an error threshold. The operations of 1220 may be performed according to the methods described herein. In certain examples, aspects of the operations of 1220 may be performed by a clustering component as described with reference to FIGS. 6 through 8.

At 1225, the clustering server may receive a new query request message corresponding to a specific user identifier of the plurality of user identifiers. The operations of 1225 may be performed according to the methods described herein. In certain examples, aspects of the operations of 1225 may be performed by a query request component as described with reference to FIGS. 6 through 8.

At 1230, the clustering server may identify an additional selected object type for the new query request message. The operations of 1230 may be performed according to the methods described herein. In certain examples, aspects of the operations of 1230 may be performed by an object identification component as described with reference to FIGS. 6 through 8.

At 1235, the clustering server may update the distribution data based on the additional selected object type. The operations of 1235 may be performed according to the methods described herein. In certain examples, aspects of the operations of 1235 may be performed by a distribution data component as described with reference to FIGS. 6 through 8.

At 1240, the clustering server may update the clustering based on the updated distribution data. The operations of 1240 may be performed according to the methods described herein. In certain examples, aspects of the operations of 1240 may be performed by a clustering component as described with reference to FIGS. 6 through 8.

A method of user clustering is described. The method may include receiving a plurality of query request messages corresponding to a plurality of user identifiers, identifying a selected object type for each query request message based on the received plurality of query request messages, determining distribution data for the plurality of user identifiers, where the distribution data includes an association between each user identifier of the plurality of user identifiers and a number of query request messages associated with each selected object type, and clustering the plurality of user identifiers into a plurality of clusters based on the distribution data and a relationship between a number of the plurality of clusters and an error threshold.

Another apparatus for user clustering is described. The apparatus may include a processor, memory in electronic communication with the processor, and instructions stored in the memory. The instructions may be operable to cause the processor to receive a plurality of query request messages corresponding to a plurality of user identifiers, identify a selected object type for each query request message based on the received plurality of query request messages, determine distribution data for the plurality of user identifiers, where the distribution data includes an association between each user identifier of the plurality of user identifiers and a number of query request messages associated with each selected object type, and cluster the plurality of user identifiers into a plurality of clusters based on the distribution data and a relationship between a number of the plurality of clusters and an error threshold.

A non-transitory computer-readable medium for user clustering is described. The non-transitory computer-readable medium may include instructions operable to cause a processor to receive a plurality of query request messages corresponding to a plurality of user identifiers, identify a selected object type for each query request message based on the received plurality of query request messages, determine distribution data for the plurality of user identifiers, where the distribution data includes an association between each user identifier of the plurality of user identifiers and a number of query request messages associated with each selected object type, and cluster the plurality of user identifiers into a plurality of clusters based on the distribution data and a relationship between a number of the plurality of clusters and an error threshold.

Some examples of the method, apparatus, and non-transitory computer-readable medium described above may further include processes, features, means, or instructions for receiving a new query request message corresponding to a specific user identifier of the plurality of user identifiers.

Some examples of the method, apparatus, and non-transitory computer-readable medium described above may further include processes, features, means, or instructions for identifying a cluster of the plurality of clusters that contains the specific user identifier. Some examples of the method, apparatus, and non-transitory computer-readable medium described above may further include processes, features, means, or instructions for determining one or more predictive queried object types for the specific user identifier based on the cluster. Some examples of the method, apparatus, and non-transitory computer-readable medium described above may further include processes, features, means, or instructions for transmitting an indication of the one or more predictive queried object types to a user device of the specific user identifier for display in a user interface.

In some examples of the method, apparatus, and non-transitory computer-readable medium described above, determining the one or more predictive queried object types includes determining a predictive order of relevant queried object types for the specific user identifier based on the cluster, where the transmitted indication of the one or more predictive queried object types indicates the predictive order.

In some examples of the method, apparatus, and non-transitory computer-readable medium described above, the determining the one or more predictive queried object types may be further based on a machine-learned prediction model.

In some examples of the method, apparatus, and non-transitory computer-readable medium described above, the machine-learned prediction model includes a random forest model, a neural network model, or a combination thereof.

Some examples of the method, apparatus, and non-transitory computer-readable medium described above may further include processes, features, means, or instructions for identifying an additional selected object type for the new query request message. Some examples of the method, apparatus, and non-transitory computer-readable medium described above may further include processes, features, means, or instructions for updating the distribution data based on the additional selected object type. Some examples of the method, apparatus, and non-transitory computer-readable medium described above may further include processes, features, means, or instructions for updating the clustering based on the updated distribution data.

Some examples of the method, apparatus, and non-transitory computer-readable medium described above may further include processes, features, means, or instructions for determining a time period for analysis, where the plurality of query request messages may be received during the time period for analysis.

Some examples of the method, apparatus, and non-transitory computer-readable medium described above may further include processes, features, means, or instructions for selecting the number of the plurality of clusters based on a clustering algorithm, where the clustering algorithm depends on the relationship between the number of the plurality of clusters and the error threshold.

In some examples of the method, apparatus, and non-transitory computer-readable medium described above, the clustering algorithm includes a KMeans algorithm, a Gaussian mixture model, a hierarchical clustering algorithm, a density-based clustering algorithm, or a combination thereof.

Some examples of the method, apparatus, and non-transitory computer-readable medium described above may further include processes, features, means, or instructions for storing the distribution data in a click-frequency dictionary database.

In some examples of the method, apparatus, and non-transitory computer-readable medium described above, the distribution data includes indicators of a number of clicks associated with selected object types, a number of characters in a query request message, a number of words in the query request message, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for user clustering, comprising:
receiving a plurality of query request messages corresponding to a plurality of user identifiers;
identifying a selected object type for each query request message based at least in part on the received plurality of query request messages;
determining distribution data for the plurality of user identifiers, wherein the distribution data comprises an association between each user identifier of the plurality of user identifiers and a number of query request messages associated with each selected object type; and
clustering the plurality of user identifiers into a plurality of clusters based at least in part on the distribution data and a relationship between a number of the plurality of clusters and an error threshold.

2. The method of claim 1, further comprising:
receiving a new query request message corresponding to a specific user identifier of the plurality of user identifiers.

3. The method of claim 2, further comprising:
identifying a cluster of the plurality of clusters that contains the specific user identifier;
determining one or more predictive queried object types for the specific user identifier based at least in part on the cluster; and
transmitting an indication of the one or more predictive queried object types to a user device of the specific user identifier for display in a user interface.

4. The method of claim 3, wherein determining the one or more predictive queried object types comprises:
determining a predictive order of relevant queried object types for the specific user identifier based at least in part on the cluster, wherein the transmitted indication of the one or more predictive queried object types indicates the predictive order.

5. The method of claim 3, wherein determining the one or more predictive queried object types is further based at least in part on a machine-learned prediction model.

6. The method of claim 5, wherein the machine-learned prediction model comprises a random forest model, a neural network model, or a combination thereof.

7. The method of claim 2, further comprising:
identifying an additional selected object type for the new query request message;
updating the distribution data based at least in part on the additional selected object type; and
updating the clustering based at least in part on the updated distribution data.

8. The method of claim 1, further comprising:
determining a time period for analysis, wherein the plurality of query request messages are received during the time period for analysis.

9. The method of claim 1, further comprising:
selecting the number of the plurality of clusters based at least in part on a clustering algorithm, wherein the clustering algorithm depends on the relationship between the number of the plurality of clusters and the error threshold.

10. The method of claim 9, wherein the clustering algorithm comprises a KMeans algorithm, a Gaussian mixture model, a hierarchical clustering algorithm, a density-based clustering algorithm, or a combination thereof.

11. The method of claim 1, further comprising:
storing the distribution data in a click-frequency dictionary database.

12. The method of claim 1, wherein the distribution data comprises indicators of a number of clicks associated with selected object types, a number of characters in a query request message, a number of words in the query request message, or a combination thereof.

13. An apparatus for user clustering, comprising:
a processor;
memory in electronic communication with the processor; and
instructions stored in the memory and executable by the processor to cause the apparatus to:
receive a plurality of query request messages corresponding to a plurality of user identifiers;
identify a selected object type for each query request message based at least in part on the received plurality of query request messages;
determine distribution data for the plurality of user identifiers, wherein the distribution data comprises an association between each user identifier of the plurality of user identifiers and a number of query request messages associated with each selected object type; and
cluster the plurality of user identifiers into a plurality of clusters based at least in part on the distribution data and a relationship between a number of the plurality of clusters and an error threshold.

14. The apparatus of claim 13, wherein the instructions are further executable by the processor to cause the apparatus to:
receive a new query request message corresponding to a specific user identifier of the plurality of user identifiers.

15. The apparatus of claim 14, wherein the instructions are further executable by the processor to cause the apparatus to:
identify a cluster of the plurality of clusters that contains the specific user identifier;
determine one or more predictive queried object types for the specific user identifier based at least in part on the cluster; and
transmit an indication of the one or more predictive queried object types to a user device of the specific user identifier for display in a user interface.

16. The apparatus of claim 15, wherein the instructions to determine the one or more predictive queried object types are executable by the processor to cause the apparatus to:
determine a predictive order of relevant queried object types for the specific user identifier based at least in part on the cluster, wherein the transmitted indication of the one or more predictive queried object types indicates the predictive order.

17. The apparatus of claim 15, wherein determining the one or more predictive queried object types is further based at least in part on a machine-learned prediction model.

18. The apparatus of claim 14, wherein the instructions are further executable by the processor to cause the apparatus to:
identify an additional selected object type for the new query request message;
update the distribution data based at least in part on the additional selected object type; and
update the clustering based at least in part on the updated distribution data.

19. The apparatus of claim 13, wherein the instructions are further executable by the processor to cause the apparatus to:
select the number of the plurality of clusters based at least in part on a clustering algorithm, wherein the clustering algorithm depends on the relationship between the number of the plurality of clusters and the error threshold.

20. A non-transitory computer-readable medium storing code for user clustering, the code comprising instructions executable by a processor to:
receive a plurality of query request messages corresponding to a plurality of user identifiers;
identify a selected object type for each query request message based at least in part on the received plurality of query request messages;
determine distribution data for the plurality of user identifiers, wherein the distribution data comprises an association between each user identifier of the plurality of user identifiers and a number of query request messages associated with each selected object type; and
cluster the plurality of user identifiers into a plurality of clusters based at least in part on the distribution data and a relationship between a number of the plurality of clusters and an error threshold.

* * * * *